United States Patent [19]

Baron et al.

[11] 3,717,680

[45] Feb. 20, 1973

[54] PURIFICATION OF P-AMINOPHENOL
[75] Inventors: Frank A. Baron, Short Hills; Roland G. Benner, New Providence, both of N.J.
[73] Assignee: Mallinckrodt Chemical Works, Lodi, N.J.
[22] Filed: Oct. 16, 1969
[21] Appl. No.: 867,081

[52] U.S. Cl. ............................................. 260/575
[51] Int. Cl. ........................................... C07c 91/44
[58] Field of Search ................................... 260/575

[56] References Cited

UNITED STATES PATENTS 2,198,249   4/1940   Henke et al. ............... 260/575 X
3,383,416   5/1968   Benner ........................ 260/575

FOREIGN PATENTS OR APPLICATIONS 808,425   2/1959   Great Britain .................. 260/575

Primary Examiner—Lewis Gotts
Assistant Examiner—Charles F. Warren
Attorney—Wenderoth, Lind & Ponack

[57] ABSTRACT

A process is provided for obtaining purified p-aminophenol. The process comprises bringing an aromatic amine from the group of aniline, toluidines, xylidines and mixtures thereof into contact with crude p-aminophenol containing impurities and recovering the purified p-aminophenol. In a particularly important aspect the aromatic amine is brought into contact with an aqueous acid reaction medium containing p-aminophenol and impurities; the pH of the medium is adjusted to above 6 and preferably from about 6.5 to 7.5; the medium is cooled and the purified crystalline p-aminophenol is removed.

11 Claims, No Drawings

PURIFICATION OF P-AMINOPHENOL

The present invention relates to the purification of p-aminophenol. More specifically it provides a method by which crude p-aminophenol can be treated to obtain the purified material. Also, it provides a method for the purification of p-aminophenol obtained by reduction of nitrobenzene.

p-Aminophenol is a well known and highly useful industrial chemical. Principal uses for the material are as an intermediate in the production of dyestuffs and photographic chemicals and as an intermediate in the production of pharmaceuticals.

There are a number of well known methods for the production of p-aminophenol involving the reduction of nitrobenzene. Other methods conventionally involve the reduction of nitrophenol. In regard to these prior processes there may be mentioned those disclosed in U.S. Pat. Nos. 2,198,249 and 2,765,342.

In a patent recently issued to one of the inventors herein there is disclosed a particularly advantageous process for the catalytic hydrogenation of nitrobenzene in aqueous sulfuric acid. This is U.S. Pat. No. 3,383,416, issued May 14, 1968. In accordance with the process of this patent, the reduction of the nitrobenzene is interrupted prior to completion. The interruption occurs at a time when the reaction product mixture contains a sufficient amount of unreacted nitrobenzene to form an immiscible layer of nitrobenzene containing the reaction catalyst suspended therein. A separate aqueous layer contains the p-aminophenol product as a salt. The aqueous layer is separated from the nitrobenzene layer and the p-aminophenol is isolated from the aqueous layer while the nitrobenzene layer is recycled to the hydrogenation zone.

A difficulty which is encountered in these catalytic hydrogenation processes is that the p-aminophenol is present in the crude reaction mixture along with numerous side products. Some of these side products such as non-phenolic amines, caustic insoluble substances, and the like, may interfere with the preparation of pure derivatives of p-aminophenol, e.g., N-acetyl p-aminophenol.

Among the interfering side products may be quinones, quinonimines, meriquinonimines, azoxybenzene, aniline, p-aminodiphenylamine, 4-hydroxy-4'-aminobiphenyl derivatives, indophenol derivatives, p-hydroxydiphenylamine, 4,4'-diaminodiphenylether and 4-(p-hydroxy anilino)-naphthoquinone-(1,2). Also present are oxidation and reduction derivatives of the above. These may cause increased air and light sensitivity in the p-aminophenol.

In certain cases, e.g., for many non-pharmaceutical uses, the p-aminophenol can be separated from the crude reaction medium with a sufficient degree of purity by simple precipitation from the reaction medium. For many other uses, however, as for example, for use as an intermediate in preparing N-acetyl p-aminophenol (Acetaminophen) meeting the National Formulary (N.F.) specifications, simple precipitation from the reaction medium is insufficient. This is the case since many of the side products and impurities are difficultly separable from the p-aminophenol.

It is thus advantageous to remove the deleterious side products and impurities which are present with the crude p-aminophenol and certain proposals have been made for accomplishing this. British Pat. No. 1,028,078 proposes the washing, or extraction, of p-aminophenol with isopropanol or other aliphatic alcohols. This, however, fails to remove all classes of impurities. Likewise, the extraction of p-aminophenol from its impurities with a solvent, or solvents, followed by recovery of the p-aminophenol from the solvent fails to afford a sufficiently pure product and is also uneconomical. See U.S. Pat. No. 2,013,394. Neither of these methods is sufficient to permit the conversion of the treated p-aminophenol to N-acetyl p-aminophenol which meets the National Formulary specifications.

The present invention provides a method whereby p-aminophenol is recovered in purified form from the crude reaction medium in which it is contained. In accordance with the invention crude p-aminophenol is brought into intimate contact with an aromatic amine from the group of aniline, toluidines, and xylidines and mixtures thereof. Thus, a mixture of xylidines or a mixture of toluidines can be employed. The p-aminophenol then separated from the aromatic amine is substantially free from impurities. The method is particularly applicable to a process wherein an aqueous acidic reaction medium resulting from the catalytic hydrogenation of nitrobenzene is employed as starting material. To the aqueous medium there is added an aromatic amine as indicated above and the pH of the medium is adjusted so that the p-aminophenol is present as the free base. The pH adjustment can be made prior to the addition of the aromatic amine or after such material has been added. The resulting slurry is well mixed at room temperature up to about the reflux temperature of the slurry (about 98°–99°C). The slurry is then cooled to a temperature of about 30°C or below and the p-aminophenol crystallizes, i.e. precipitates out of solution. The crystalline p-aminophenol is then removed from the mixture by filtration as for example by centrifugation. In separating the purified p-aminophenol it is convenient to subject the centrifuge cake to sucessive washes. Such washing techniques are well known in the art. Initially the cake is washed with fresh aromatic amine, e.g., aniline, to displace spent aromatic amine in the cake with fresh material. Secondly, the cake is washed with a lower boiling solvent which is miscible with the aromatic amine, e.g., toluene, wherein the aromatic amine solvent will be displaced by the lower boiling solvent. The cake is then washed with an aqueous solution of an oxidation stabilizer for the purified p-aminophenol. This latter wash will have the effect of displacing the lower boiling solvent from the cake and will bring the oxidation stabilizer into contact with the p-aminophenol crystals and thus provide a coating on such crystals. The oxidation stabilizer can be, for example, $NaHSO_3$, $Na_2SO_3$, $Na_2S_2O_4$ and the like materials. By utilizing high levels of aromatic amine in the purification process of this invention, it is possible to avoid the necessity of using the above-described washing technique. In such case it is possible to achieve separation of the p-aminophenol crystals from the aromatic amine by simple drying. This will not, however, achieve the coating of the crystals with an oxidation stabilizer.

According to this aspect of the invention, the aromatic amine is added to the aqueous acidic solution which has been separated from any unreacted nitrobenzene. If the purification process of this invention is used in conjunction with the process of the U.S. Pat. No. 3,383,416 as referred to previously herein, it will be recalled that the nitrobenzene layer containing the catalyst is removed from recycling thus leaving the aqueous acidic medium containing the p-aminophenol along with impurities and side products.

The aromatic amine is preferably added to the aqueous acidic reaction mixture. Following the addition of the aromatic amine the pH is adjusted to a pH of above 6.0, but preferably to the range of pH 6.5–7.5, and most advantageously from pH 6.8 to 7.2. The pH adjustment can be made with any conventional pH adjusting agent which will not interfere with the subsequent isolation of the solid p-aminophenol, e.g., ammonia, calcium hydroxide, sodium hydroxide, etc.

The amount of aromatic amine which is added for optimum results will depend upon the specific process conditions used in the hydrogenation, the temperature at which the purification is carried out and the specific impurities contained in the reaction mixture. In general the amount will range from about 0.2 to about 10 parts by weight of aromatic amine per part by weight of p-aminophenol. Preferably the value is from 0.5 to 1.5 parts by weight per part by weight of p-aminophenol in the crude reaction mixture.

For effective removal of the impurities and side products, and in order to obtain the solid p-aminophenol in a high degree of purity, the adjustment of the pH of the aqueous acidic solution to a value of from about 6.5 to about 7.5 is important. At a pH which is too low, some of the p-aminophenol is present as a salt of sulfuric acid. This salt is very soluble in water and thus would not crystallize out on cooling after treatment with aromatic amine. At a pH of 6.5 to 7.5 the material is present as free base and has little solubility in cold water. The extraction can be carried out at higher pH values but care must be exercised to avoid exposure to oxygen which will cause discoloration at these high pH values. When fixed alkali, e.g., sodium hydroxide, is used to adjust the pH, it is preferred not to exceed pH 8.5 because some of the p-aminophenol will then be present as the soluble alkali metal salt and, therefore, cannot be recovered without further pH adjustment. When ammonia is used, the pH can be adjusted above 7.5 without forming a soluble ammonium salt; however, the additional ammonia used is wasteful and serves no useful purpose.

In one aspect of the present invention, previously prepared crude p-aminophenol can be purified by introducing such material into an aqueous acidic solution and then carrying out the process as previously described herein. The acidic solution can be a mineral acid such as sulfuric acid or hydrochloric acid and the like or a low molecular weight organic acid such as acetic acid and the like. In an alternative embodiment crude p-aminophenol wet cake or a crude dry p-aminophenol is admixed with aromatic amine and water. When carrying out this latter procedure no adjustment in pH is made during the treatment.

As the aromatic amine component there is employed aniline, a toluidine, xylidine or mixtures of these. It is to be emphasized that all of the isomers of the aromatic amines can be employed and particularly useful are those isomeric mixtures which are commercially available as for example mixed xylidines. Aniline constitutes the presently preferred material.

Following the admixing of the aromatic amine with the reaction mixture, the final pH adjustment and the cooling of the solution, the p-aminophenol crystallizes out of solution and is separated in purified form as described above. The aromatic amine layer can then be separated from the aqueous layer of the filtrate and subjected to treatment as desired to recover both aromatic amine and side products and impurities. This can be accomplished for example by distillation.

In order that the invention may be understood more completely, Examples are presented below. These Examples are illustrative of the invention rather than exhaustive thereof and modifications thereof can be made by those skilled in the art within the ambit of the invention. In the Examples, parts are by weight unless otherwise indicated. Parts by weight bear the same relationship to parts by volume as do grams to milliliters.

The p-aminophenol solutions used in the Examples, except as otherwise indicated are obtained by the reduction of nitrobenzene with hydrogen in sulfuric acid solution as described in Example 1 of U.S. Pat. No. 3,383,416. The reduction is interrupted prior to completion. In order to facilitate separation of the catalyst suspended in the unreacted nitrobenzene, additional nitrobenzene is added after which the lower organic layer of catalyst suspended in nitrobenzene is separated from the upper aqueous layer of p-aminophenol-containing solution. The upper aqueous layer is boiled to distill sufficient water to remove dissolved nitrobenzene, and the nitrobenzene-free solution containing p-aminophenol is obtained. The solution contains up to about 9 percent by weight p-aminophenol and up to 11 to 12 percent weight sulfuric acid.

EXAMPLE 1

185 parts of aniline are added to 1,800 parts of an aqueous sulfuric acid solution containing approximately 9 percent by weight p-aminophenol. The mixture is neutralized with ammonia to pH 7.2, cooled and filtered on a centrifuge and washed with 30 part portions of aniline and then with 30 parts of toluene, then 30 parts of 2 percent aq. sodium bisulfite. There is obtained 168 parts of p-aminophenol as wet filter cake (150 parts dry basis). 159 parts of the wet cake are acetylated as follows:

Under nitrogen blanket 142 parts of the substantially pure p-aminophenol (159 parts wet cake) are added to 1,000 parts water and heated to 90°C. About 70 parts of 50 percent sulfuric acid is added to dissolve all of the p-aminophenol after which it is decolorized with a trace of sodium hydrosulfite. Activated carbon (5 parts) is then added and the solution filtered at 90° to 95°C. Sufficient aqueous ammonia is then introduced beneath the surface of the filtrate to bring the pH of the mixture to 7.0–7.2.

The aminophenol in the filtrate is acetylated at 40°C by addition of 145 parts acetic anhydride while agitating the mixture.

During the acetylation, enough heat is liberated to raise the temperature of the mixture to about 60°C. After all of the acetic anhydride has been added, the mixture is kept at 80° – 85°C for several minutes, then allowed to cool under agitation. At this stage, the nitrogen blanket over the reaction can be removed.

During the cooling of the acetylation mixture to 15°C, white crystals of N-acetyl p-aminophenol precipitate. The crystals are isolated by filtration. After recrystallization from water, the N-acetyl p-aminophenol (125 parts) passes all of the National Formulary specifications for this product.

EXAMPLE 2

1,800 parts of the aqueous solution of sulfuric acid containing approximately 9 percent by weight p-aminophenol is neutralized (while agitating) with anhydrous ammonia to a pH of 7.0 to 7.2 at 80°C. The neutralized mixture is cooled to a temperature of about 30°C and the crystals in the resulting slurry are removed by filtration on a centrifuge. The crystals are washed with 30 parts of toluene, and 30 parts 2 percent aqueous sodium bisulfite.

The wet cake is then acetylated as in Example 1. The N-acetyl p-aminophenol so obtained is recrystallized from water as in Example 1 and the recrystallized product has a melting point which is about 1°C lower than the product of Example 1 and which fails the caustic solubility test of the National Formulary specifications.

EXAMPLE 3

Wet crystals of p-aminophenol are isolated from 1,800 parts of solution as described in Example 2, but are not acetylated. Instead the wet cake of p-aminophenol is agitated with 800 parts water and 185 parts aniline at 80 to 85°C for several hours. The slurry is then cooled to 30°C and filtered on a centrifuge. The wet cake of p-aminophenol is washed with 30 parts of aniline and 30 parts of toluene. It is then acetylated and treated as described in Example 1. The resulting N-acetyl aminophenol passes all the National Formulary specifications for the product.

EXAMPLE 4

60 parts of o-toluidine are added to 1,000 parts of an aqueous sulfuric acid solution containing approximately 8 percent by weight p-aminophenol. The mixture is neutralized with ammonia to pH 7.2, cooled and filtered on a centrifuge and washed with 30 part portions of o-toluidine and then with 30 parts of toluene, then 30 parts of 2 percent aq. sodium bisulfite. There is obtained 70 parts of p-aminophenol as wet filter cake (60 parts dry basis). 70 parts of the wet cake are acetylated as follows:

Under nitrogen blanket 60 parts of the substantially pure p-aminophenol are added to 500 parts water and heated to 90°C. About 40 parts of 50 percent sulfuric acid is added to dissolve all of the p-aminophenol after which it is decolorized with a trace of sodium hydrosulfite. Activated carbon (5 parts) is then added and the solution filtered at 90° to 95°C. After the filtrate has cooled to room temperature, sufficient aqueous ammonia is introduced beneath the surface of the filtrate to bring the pH of the mixture to 7.0–7.2.

The aminophenol in the filtrate is acetylated at 40°C by addition of 75 parts acetic anhydride while agitating the mixture.

During the acetylation, enough heat is liberated to raise the temperature of the mixture to about 60°C. After all of the acetic anhydride has been added, the mixture is kept at 80°–85°C for several minutes, then allowed to cool under agitation. At this stage, the nitrogen blanket over the reaction can be removed.

During the cooling of the acetylation mixture to 15°C, white crystals of N-acetyl p-aminophenol precipitate. The crystals are isolated by filtration. After recrystallization from water, the N-acetyl p-aminophenol (53 parts) passes all of the National Formulary specifications for this product.

EXAMPLE 5

110 parts of commercially available "DuPont" mixed xylidines are added to 1,500 parts of an aqueous sulfuric acid solution containing approximately 8 percent by weight p-aminophenol. The mixture is neutralized with ammonia to pH 7.2 cooled and filtered on a centrifuge and washed with 30 part portions of mixed xylidine and then with 30 parts of toluene, then 30 parts of 2% aq. sodium bisulfite. There is obtained 105 parts of p-aminophenol as wet filter cake (94 parts dry basis). 105 parts of the wet cake are acetylated as follows:

Under nitrogen blanket 94 parts of the substantially pure p-aminophenol are added to 750 parts water and heated to 90°C. About 55 parts of 50 percent sulfuric acid is added to dissolve all of the p-aminophenol after which it is decolorized with a trace of sodium hydrosulfite. Activated carbon (5 parts) is then added and the solution filtered at 90° to 95°C. After the filtrate has cooled to room temperature, sufficient aqueous ammonia is introduced beneath the surface of the filtrate to bring the pH of the mixture to 7.0–7.2.

The aminophenol in the filtrate is acetylated at 40°C by addition of 115 parts acetic anhydride while agitating the mixture.

During the acetylation, enough heat is liberated to raise the temperature of the mixture to about 60°C. After all of the acetic anhydride has been added, the mixture is kept at 80°–85°C for several minutes, then allowed to cool under agitation. At this stage, the nitrogen blanket over the reaction can be removed.

During the cooling of the acetylation mixture to 15°C, white crystals of N-acetyl p-aminophenol precipitate. The crystals are isolated by filtration. After recrystallization from water, the N-acetyl p-aminophenol (83 parts) passes all of the National Formulary specifications for this product.

EXAMPLE 6

60 parts of mixed toluidines are added to 1,000 parts of an aqueous sulfuric solution containing approximately 7 percent by weight p-aminophenol. The mixture is neutralized with ammonia to pH 7.2, cooled and filtered on a centrifuge and washed with 30 part portions of mixed toluidine and then with 30 parts of toluene, then 30 parts of 2% aq. sodium bisulfite. There is obtained 72 parts of p-aminophenol as wet filter cake (61 parts dry basis). 72 parts of the wet cake are acetylated as follows:

Under nitrogen blanket 61 parts of the substantially pure p-aminophenol are added to 500 parts water and heated to 90°C. About 40 parts of 50 percent sulfuric acid is added to dissolve all of the p-aminophenol after which it is decolorized with a trace of sodium hydrosulfite. Activated carbon (5 parts) is then added and the solution filtered at 90° to 95°C. After the filtrate has cooled to room temperature, sufficient aqueous ammonia is introduced beneath the surface of the filtrate to bring the pH of the mixture to 7.0–7.2.

The aminophenol in the filtrate is acetylated at 40°C by addition of 70 parts acetic anhydride while agitating the mixture.

During the acetylation, enough heat is liberated to raise the temperature of the mixture to about 60°C. After all of the acetic anhydride has been added, the mixture is kept at 80°–85°C for several minutes, then allowed to cool under agitation. At this stage, the nitrogen blanket over the reaction can be removed.

During the cooling of the acetylation mixture to 15°C, white crystals of N-acetyl p-aminophenol precipitate. The crystals are isolated by filtration. After recrystallization from water, the N-acetyl p-aminophenol (55 parts) passes all of the National Formulary specifications for this product.

The present invention has been described with reference to the purification of p-aminophenol. It is to be pointed out that it is applicable to aminophenols in general such as amino thymol, mono- and poly-alkyl and aryl derivatives as well as substitution products thereof.

What is claimed is:

1. A method for purifying crude p-aminophenol prepared by the catalytic hydrogenation of nitrobenzene in aqueous sulfuric acid which consists essentially of admixing an aromatic amine selected from the group consisting of aniline, toluidines, xylidines and mixtures of xylidines with the crude p-aminophenol at a temperature of from room temperature to the reflux temperature of the mixture and a ratio of 0.2 – 10 parts by weight of aromatic amine per part by weight of p-aminophenol, adjusting the pH of the mixture to 6.5 – 7.5, cooling the resultant mixture to 30°C or below and separating the precipitated p-aminophenol from the cooled mixture by filtration, thus leaving the impurities contained in the aromatic amine.

2. A method as in claim 1 wherein the aromatic amine is aniline.

3. A method as in claim 1 wherein ammonia is employed to raise the pH value of the solution.

4. A method as in claim 1 wherein the aromatic amine is mixed xylidines.

5. A method for purifying crude p-aminophenol prepared by the catalytic hydrogenation of nitrobenzene in aqueous sulfuric acid which consists essentially of admixing an aromatic amine selected from the group consisting of aniline, toluidines, xylidines and mixtures of xylidines with an aqueous acidic solution of the crude p-aminophenol at a temperature of from room temperature to the reflux temperature of the mixture and a ratio of 0.2 – 10 parts by weight of aromatic amine per part by weight of p-aminophenol, adjusting the pH of the mixture to 6.5 – 7.5, cooling the resultant mixture to 30°C or below and separating the precipitated p-aminophenol from the cooled mixture by filtration, thus leaving the impurities contained in the aromatic amine.

6. A method as in claim 5 wherein the aromatic amine is aniline.

7. A method for purifying crude p-aminophenol prepared by the catalytic hydrogenation of nitrobenzene in aqueous sulfuric acid which consists essentially of admixing an aromatic amine selected from the group consisting of aniline, toluidines, xylidines and mixtures of xylidines with the crude p-aminophenol at a temperature of from room temperature to the reflux temperature of the mixture and a ratio of 0.2 – 10 parts by weight of aromatic amine per part by weight of p-aminophenol, adjusting the pH of the mixture to 6.5 – 7.5, cooling the resultant mixture to 30°C or below, filtering precipitated p-aminophenol from the cooled mixture on a centrifuge, thus leaving the impurities contained in the aromatic amine, washing the precipitated product with further aromatic amine, subjecting the washed product to washing with an inert low boiling solvent which is miscible with the aromatic amine, subjecting the thus-washed product to washing with an aqueous solution of an oxidation stabilizer for the p-aminophenol and drying the p-aminophenol.

8. A method as in claim 7 wherein the aromatic amine is aniline, the low-boiling solvent is toluene and the aqueous solution is an aqueous solution of sodium bisulfite.

9. The method according to claim 7, wherein the aromatic amine is aniline.

10. A method for purifying crude p-aminophenol prepared by the catalytic hydrogenation of nitrobenzene in aqueous sulfuric acid which consists essentially of admixing an aromatic amine selected from the group consisting of aniline, toluidines, xylidines and mixtures of xylidines with an aqueous acidic solution of the crude p-aminophenol at a temperature of from room temperature to the reflux temperature of the mixture and a ratio of 0.2 – 10 parts by weight of aromatic amine per part by weight of p-aminophenol, adjusting the pH of the mixture to 6.5 – 7.5, cooling the resultant mixture to 30°C or below, filtering precipitated p-aminophenol from the cooled mixture, thus leaving the impurities contained in the aromatic amine, washing the precipitated product with further aromatic amine, subjecting the washed product to washing with an inert low boiling solvent which is miscible with the aromatic amine, subjecting the thus-washed product to washing with an aqueous solution of an oxidation stabilizer for the p-aminophenol and drying the p-aminophenol.

11. The method according to claim 10, wherein the aromatic amine is aniline.

* * * * *